(12) United States Patent
Kohl et al.

(10) Patent No.: US 7,775,718 B2
(45) Date of Patent: Aug. 17, 2010

(54) ROLLER GUIDE FOR ADJUSTABLE VEHICLE SEATS

(75) Inventors: Josef Kohl, Amberg (DE); Markus Haner, Rothenstadt (DE)

(73) Assignee: Grammer AG, Amberg (DE)

( * ) Notice: Subject to any disclaimer, the term of this patent is extended or adjusted under 35 U.S.C. 154(b) by 1214 days.

(21) Appl. No.: 11/161,111

(22) Filed: Jul. 22, 2005

(65) Prior Publication Data

US 2006/0029308 A1    Feb. 9, 2006

(30) Foreign Application Priority Data

Aug. 7, 2004    (DE) .................. 10 2004 038 507

(51) Int. Cl.
    *B60N 2/07*      (2006.01)
    *F16C 29/04*     (2006.01)
(52) U.S. Cl. .................. 384/34; 384/53; 384/55; 384/58; 248/430
(58) Field of Classification Search .............. 384/19, 384/34, 50, 53, 54, 55, 58; 248/430
See application file for complete search history.

(56) References Cited

U.S. PATENT DOCUMENTS

| | | | | |
|---|---|---|---|---|
| 1,537,084 | A | * | 5/1925 | Hansen ................... 384/53 |
| 3,265,450 | A | | 8/1966 | Aho |
| 4,621,784 | A | * | 11/1986 | Kaesling et al. .......... 248/430 |
| 4,648,141 | A | * | 3/1987 | Mansouris et al. ............ 5/8 |
| 6,264,180 | B1 | | 7/2001 | Ropp |

* cited by examiner

*Primary Examiner*—Thomas R Hannon
*Assistant Examiner*—Terence Boes
(74) *Attorney, Agent, or Firm*—Black Lowe & Graham, PLLC

(57) ABSTRACT

A roller guide for adjustable vehicle seats. The roller guide includes at least one guide rail which is at least partially open at the side and at least two rollers which roll in the guide rail and are connected to the vehicle seat via at least one axle. At least one of the rollers is shaped like a cone or a truncated cone. The cone surface can roll as the bearing surface of the roller moves along an inner wall of the guide rail. The inner wall being arranged at an angle with respect to the longitudinal axis of the axle.

6 Claims, 4 Drawing Sheets

ROLLER GUIDE FOR ADJUSTABLE VEHICLE SEATS

CROSS-REFERENCE TO RELATED APPLICATIONS

This application claims priority to German Patent Application Ser. No. 10 2004 038 507.6 filed Aug. 7, 2004.

FIELD OF THE INVENTION

The invention relates to a roller guide for adjustable vehicle seats.

BACKGROUND OF THE INVENTION

Conventionally, U-shaped guide rails for guiding rollers rolling therein are used to guide vehicle seats within a vehicle, wherein the guide rails run parallel to one another and are fixed to the body of the vehicle and the rollers are connected to a seat frame of the vehicle seat. Alternatively, the guide rails may already be integrated in the seat frame.

Such guide arrangements necessarily require the provision of an intermediate space between an inner side of the U-shaped profile of the guide rail and a bearing surface of the roller rolling therein, since the rolling directions of the roller on the upper and lower side in a given movement direction of the roller are opposed. This means that a rolling movement of the roller within the guide rail is possible only when the roller bears against one of the sides of the guide rail, namely the lower side or the upper side thereof. Otherwise, if both the upper side and the lower side of the guide rail were to bear against the roller, only a sliding movement of the roller within the guide rail would be possible, but not a rolling movement. On account of the necessary intermediate space, a play between guide rails and rollers arises, particularly after long-term use of the vehicle seat. Added to this is the fact that, in such roller guides, only small axial forces, that is to say forces acting laterally on the guide rail, can be absorbed by the rollers. This often results in one-sided wear of the rollers when axial forces occur. This gives rise to undesirable play between rollers and guide rail in the axial and radial direction.

U.S. Pat. No. 6,264,180 B1 discloses a roller guide for adjustable vehicle seats, in which two individual rollers or one roller split into two are/is fitted to each end of each axle of a seat frame of the vehicle seat, which roller or rollers can be adjusted by means of an adjustment mechanism with regard to their axial spacing from a guide rail in which they roll. The rollers are designed as cylindrical rollers and, when acted upon by axial forces, press against an inner end wall of the guide rail, so that the axial forces are absorbed exclusively by the inner end wall. This leads to undesirable friction forces and to undesirably high wear of this inner wall and of the rollers pressing against it.

Accordingly, it is an object of the present invention to provide a roller guide for adjustable vehicle seats, which allows play-free and virtually wear-free rolling of rollers within guide rails.

BRIEF SUMMARY OF THE INVENTION

One aspect of the invention is that, a roller guide for adjustable vehicle seats includes at least one guide rail which is at least partially open at the side and at least two rollers which roll in the guide rail. The rollers are connected to the vehicle seat via a common axle. At least one of the rollers is shaped like a cone or a truncated cone, wherein the cone surface thereof can roll as the bearing surface of the roller along an inner wall of the guide rail. The inner wall is arranged at an angle with respect to the longitudinal axis of the axle. If the guide rail has a trapezium-shaped cross section on the inside, the bearing surface of the first roller can bear against the first side thereof and the bearing surface of the second roller can bear against the second side thereof.

Because the first side encloses a first angle and the second side encloses a second angle, different from the first angle, with an axle on which both rollers are fitted coaxially, the bearing surface of the first roller moves in one direction of rotation on account of the fact that it bears against the upper guide rail side during the rolling movement and the second roller moves in an opposite direction of rotation on account of the fact that its bearing surface bears against the lower guide rail side. These opposite directions of rotation do not adversely affect one another, since both sides are arranged at different angles and in this respect the bearing surface of the rollers only bears against that side whose angle corresponds to the angle of the respective bearing surface.

The first roller is arranged at the end of the axle and has a relatively small diameter. Its angled bearing surface is assigned to that side of the trapezium-shaped cross section of the guide rail whose first angle is greater than the second angle of the second side. Accordingly, the second roller has a bearing surface which is less angled, that is to say less conical, and the angle of which corresponds to the second angle, which the second side encloses with the axle. This second angle may lie in an angle range from 0° 80°, that is to say may represent a side arranged at right angles to the base line of the trapezium. This results in a cylindrical shape of the second roller, that is to say without an angled bearing surface.

The first angle of the first side, on the other hand, lies in an angle range of preferably 10-80°.

Alternatively, the first roller arranged at the end may be designed to be cylindrical and be assigned to that side of the guide rail whose first angle is smaller than the second angle of the second side or is zero. Accordingly, the first angle lies in an angle range of 00-80° and the second angle lies in an angle range of 10-80°.

On account of the trapezium-shaped design of the guide rail and the preferably coaxial rollers designed in a manner complementary thereto in combination with the rollers being acted upon by a spring, it is possible to obtain reliable and permanent guidance of the rollers within the guide rails without play both in the radial and axial direction based on preferably 2 axles of a vehicle seat. Alternatively, the rollers may be arranged on two different axles, which run parallel to one another.

According to one preferred embodiment, the second roller is designed with a shoulder-like portion to additionally absorb axial forces. The diameter of the shoulder-like portion is greater than the diameter of the rest of the roller and the shoulder-like portion bears against a support surface of the guide rail, which is directed towards the center of the vehicle seat. Such a support surface is preferably oriented parallel to the base line of the trapezium.

In order to achieve spring action and a permanently sufficient spacing of the two rollers, at least one spring element, for example a Belleville washer or some other annular element, may be arranged between the two rollers. In this way, the bearing surfaces of the rollers are reliably held against the leg-like inner sides of the guide rail, in order to ensure a rolling movement of the rollers when adjusting the vehicle seat.

According to one preferred embodiment, both rollers are shaped as cones or truncated cones, the cone surfaces of which are identical in terms of their dimensions and inclination. The bearing surfaces of the two rollers are assigned to different inner walls of the guide rail, which are inclined in the same way as the cone surfaces, and are rolled on these inner walls. Since the cone surfaces roll on different sides along the inner walls, a rolling movement of the rollers in opposite directions takes place to provide good axial and radial support of the roller arrangement as a whole with respect to the guide rail.

BRIEF DESCRIPTION OF THE SEVERAL VIEWS OF THE DRAWING

Advantages and expedient features can be found in the following description in conjunction with the drawing. In the drawing.

DETAILED DESCRIPTION OF THE INVENTION

Figure 1:
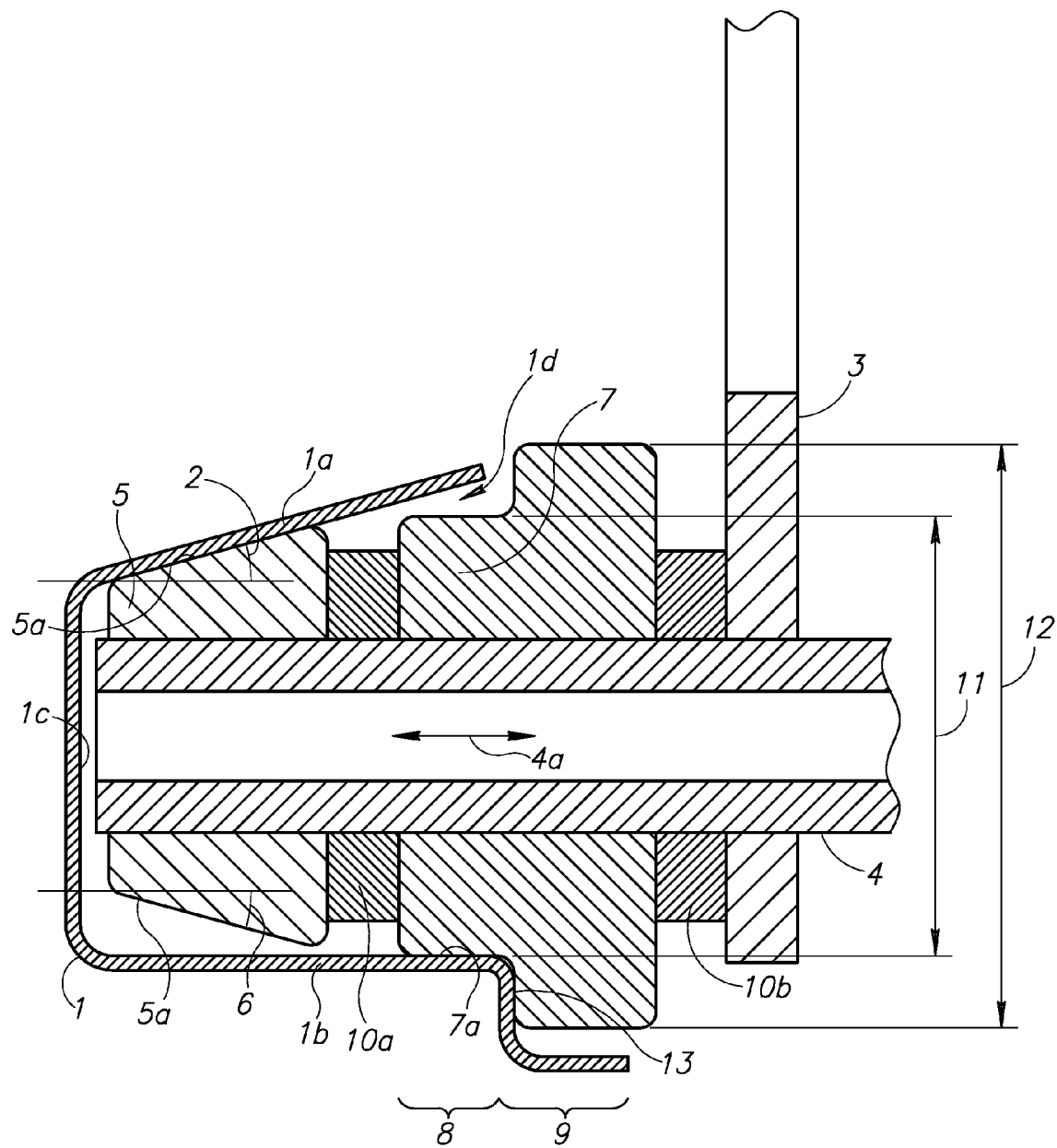
FIG. 1 shows a cross section of a roller guide according to a first embodiment of the invention.

FIG. 1 shows in cross section a roller guide according to a first embodiment of the invention. As can be seen from this diagram, the guide rail 1 has a trapezium-shaped cross section, which includes a first side 1a, a second side 1b and an end side 1c that represents the base line of the trapezium. The guide rail 1 is designed to be open in the region of a fourth side 1d, which represents a second base line of the trapezium. The fourth side 1d faces towards the center of the vehicle seat.

The first side 1a is oriented at an angle 2 with respect to an axle orientation. A support plane 3 serves to connect the rest of the vehicle seat (not shown) to the roller guide.

A first roller 5, a second roller 7, and the support plane 3 are arranged on an axle 4. The first and second rollers 5, 7 are mounted on the axle 4 such that they can roll or slide. The first roller 5 has a bearing surface 5a that is designed to be cone-shaped in such a way that it encloses an angle 6 with the axle orientation. The angle 6 corresponds to the angle 2 at which the bearing surface bears against the side 1a.

Like the side 1b, a bearing surface 7a of the second roller 7 is oriented parallel to the axle orientation and, unlike the first roller 5, does not bear against the side 1a but rather against the side 1b.

The second roller 7 includes a first portion 8 and a second, shoulder-like portion 9.

At least one spring element 10a is arranged between the rollers 5, 7 in order to keep them at a permanent spacing, and an annular disc 10b is arranged between the roller 7 and the support plane 3 in order to keep them at a permanent spacing.

The first portion 8 of the second roller 7 has a diameter 11 which is smaller than a diameter 12 of the second, shoulder-like portion 9. The shoulder-like portion 9 runs with its shoulder along a support surface 13 of the guide rail. The support surface 13 is oriented parallel to the base lines of the trapezium. As a result, axial forces from the center of the vehicle seat towards the outside can be absorbed.

Figure 2:
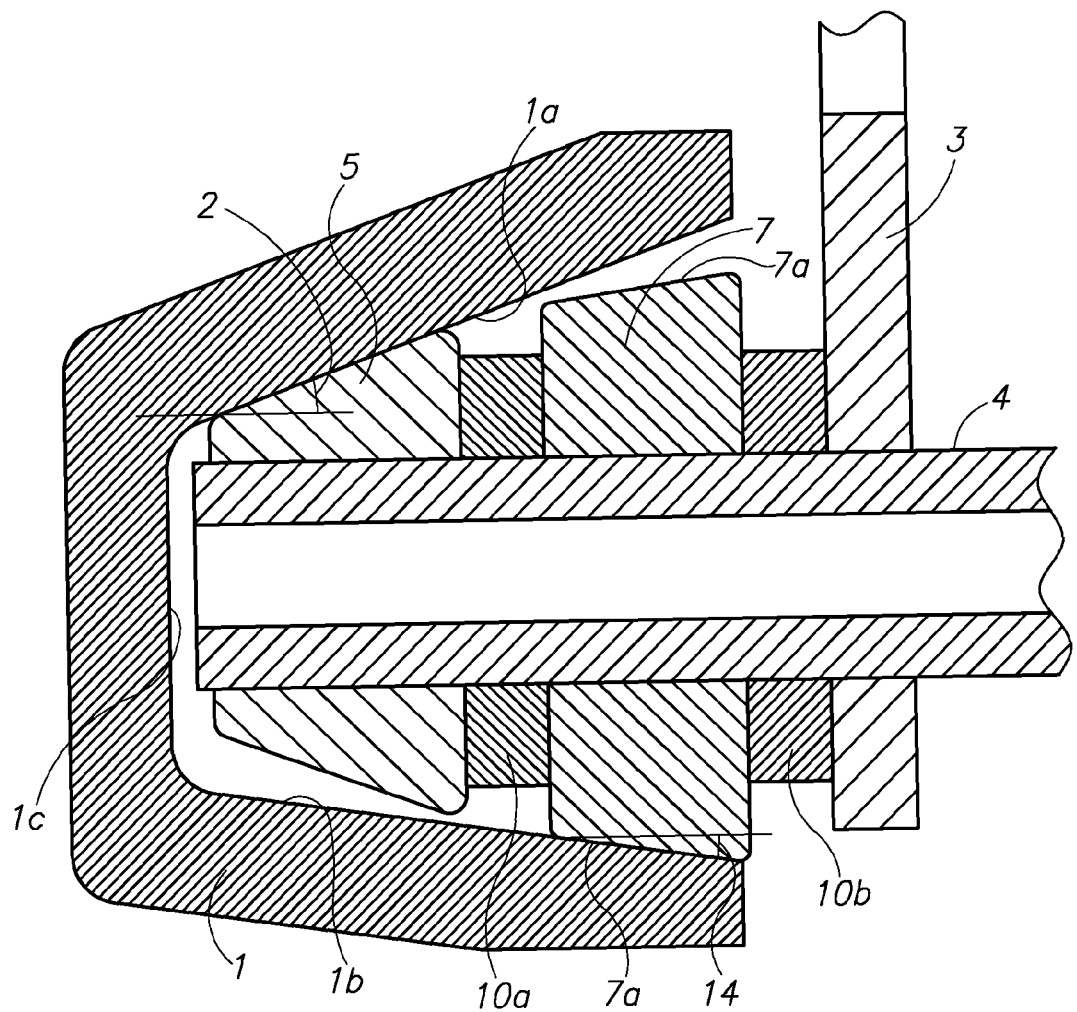
FIG. 2 shows a cross section of a roller guide according to a second embodiment of the invention.

FIG. 2 shows a cross section of a second embodiment of the invention. The roller guide shown therein once again includes the guide rail 1, which has the trapezium-shaped design on the inside with the sides 1a and 1b and the end side 1c which represents a base line of the trapezium.

The design according to the second embodiment of the invention differs from the design of the first embodiment of the invention in that the bearing surface 7a of the second roller 7, like the side 1b, is not oriented parallel to the running direction of the axle 4 but rather at an angle 14. The angle 14 lies for example in the region of 5°, whereas the angle 2 of the first side and the bearing surface 5a of the first roller lies in the region of 10°. Since the first angle 2 is greater than the second angle 14, the first roller 5 can roll along the first side 1a with one running direction without the bearing surface 7a of the second roller 7 impairing or hindering this running direction which is opposed to its own running direction.

Figure 3:
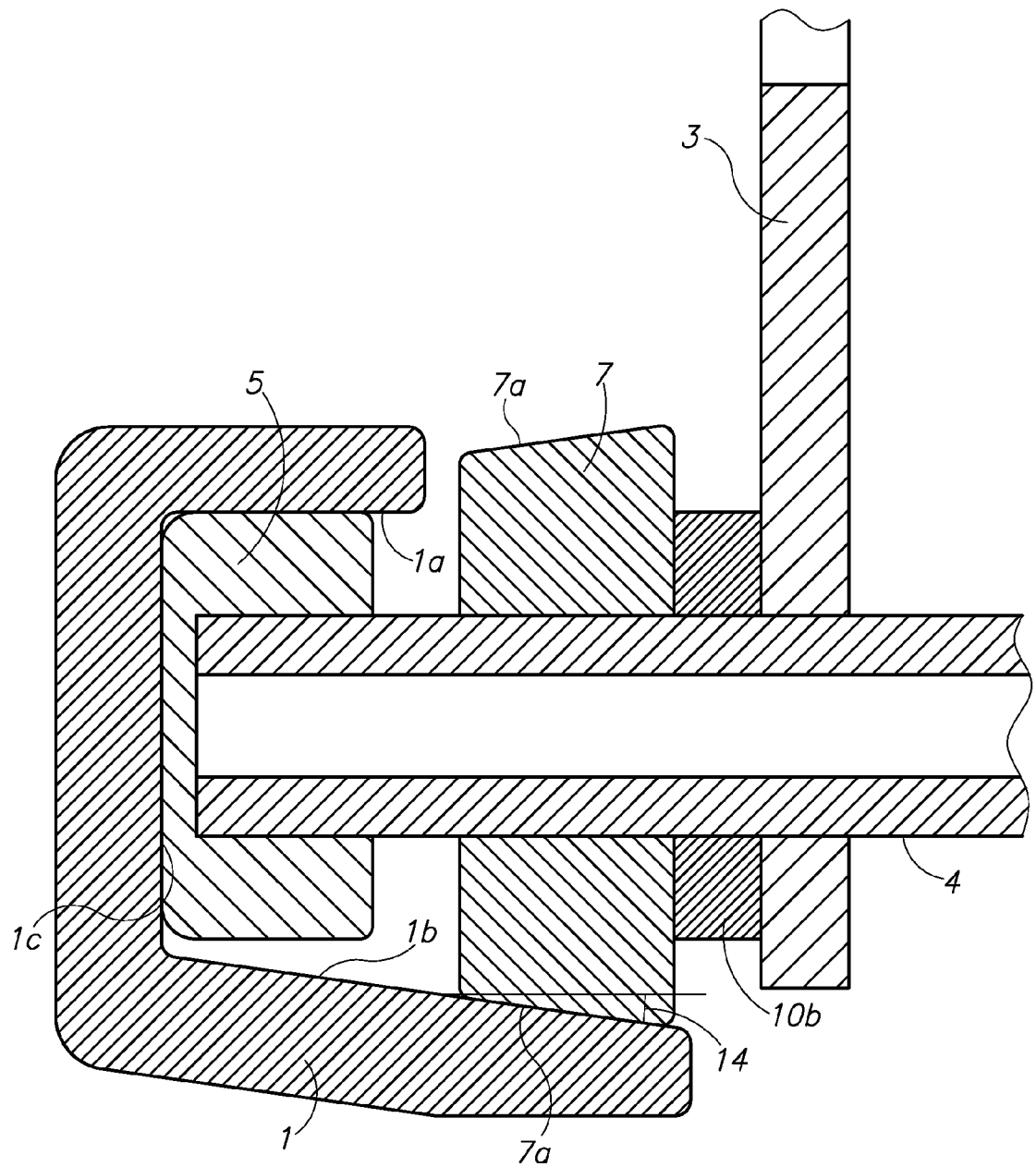
FIG. 3 shows a cross section of a roller guide according to a third embodiment of the invention.

At least two spring elements 10b must be arranged between the roller 7 and the support plane 3 and at least one spring element 10a is arranged between the two rollers 5 and 7. FIG. 3 shows a cross section of a third embodiment of the invention. Within the guide rail 1, which is designed at least partially in a trapezium-shaped manner, even though it has one extended side 1b, the roller 5 is rolled against the side 1a. The roller 5 is at the same time arranged on the end of the axle 4 by means of a sliding or rolling bearing, so that radial forces of the axle 4 can be absorbed by the roller 5. The second roller 7, on the other hand, once again has an angle 14 in its bearing surface 7a, which angle makes it possible for the roller 7 to also absorb small axial force components in addition to the absorption of axial forces of the axle 4 by the roller 5. The bearing surface 7a of the second roller 7 rolls against the side 1b, whereas the bearing surface 5a of the first roller 5 rolls against the side 1a. A spring element 10b is located between the second roller 7 and the support plane 3.

Figure 4:
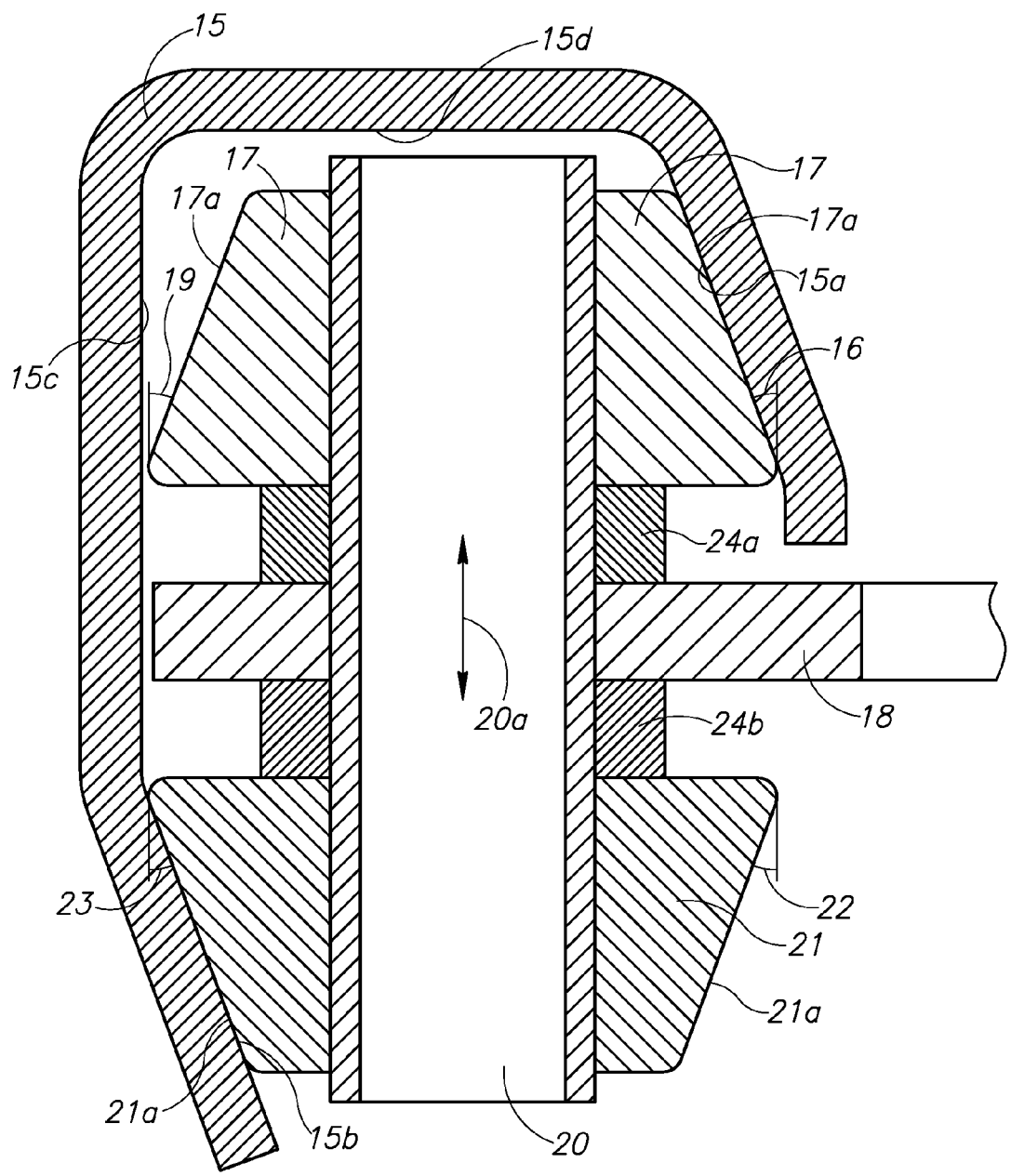
FIG. 4 shows a cross section of a roller guide according to a fourth embodiment of the invention.

FIG. 4 shows a cross section of a roller guide according to a fourth embodiment of the invention. In this case, oblique inner walls 15a and 15b of a guide rail 15 are not arranged on the upper and lower side of the guide rail, as in the case of the trapezium-shaped cross section with the sides 1a and 1b, but rather are arranged on the inner and outer side of the guide rail 15. The guide rail 15 furthermore includes the inner end face 15c and a further inner side 15d.

First and second rollers 17 and 21 have cone surfaces which are at angles 16, 19, 22 and 23 with respect to the longitudinal axis of an axle 18. The first roller 17 is arranged to bear on the right-hand side against the oblique inner wall 15a, whereas the second roller 21 rolls on the left-hand side against the inner wall 15b of the guide rail 15. In this way, the rollers 17 and 21 carry out opposite rolling movements about a further axle 20.

Between the roller 17 and the axle 18 on the one hand and the axle 18 and the second roller 21 on the other hand, spring elements 24a and 24b are arranged in order to keep a sufficient spacing and thus to ensure that the vehicle seat (not shown here) which is fixed to the axle 18 is supplied with respect to the guide rail 15 when the seat is loaded.

All the features disclosed in the application documents are claimed as essential to the invention since they are novel individually or in combination with respect to the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A roller guide for an adjustable vehicle seat, comprising:
   a guide rail having an end wall located substantially opposite an open side, an upper wall extending from an upper portion of the end wall, and a lower wall extending from a lower portion of the end wall, the upper wall having a first inner bearing surface arranged at a first angle, the lower wall having a second inner bearing surface arranged at a second angle;

a first roller having a first roller surface configured to complementarily contact and roll with respect to the first inner bearing surface;

a second roller having a second roller surface configured to complementarily contact and roll with respect to the second inner bearing surface; and an axle coupled to the rollers and coupled to the vehicle seat, the axle having a longitudinal axis, wherein the first and second angles are oriented relative to the longitudinal axis, wherein absolute values of the first and second angles are not equal.

2. The roller guide of claim 1, wherein the guide rail includes a trapezium-shaped cross section.

3. The roller guide of claim 1, wherein the first angle is between about 10° to about 80° and the second angle is between about 0° to about 80°.

4. The roller guide of claim 1, wherein the second roller includes a uniform diameter equal to or greater than a maximum diameter portion of a tapered diameter of the first roller.

5. The roller guide of claim 1, further comprising:

a shoulder coupled to the lower wall, the shoulder having a first shoulder bearing surface and a second shoulder bearing surface, the first shoulder bearing surface arranged substantially normal to the longitudinal axis of the axle; and an increased diameter portion coupled to the second roller, the increased diameter portion having an axial force contact surface engageable with the first shoulder bearing surface.

6. The roller guide according to claim 1, further comprising at least one spring element for the resilient spacing between the two rollers.

* * * * *